(12) United States Patent
Eberle et al.

(10) Patent No.: US 7,912,068 B2
(45) Date of Patent: Mar. 22, 2011

(54) LOW-LATENCY SCHEDULING IN LARGE SWITCHES

(75) Inventors: Hans Eberle, Sunnyvale, CA (US); Nils Gura, Mountain View, CA (US); Wladyslaw Olesinski, Pleasanton, CA (US); Andreas Mejia, Benifayo (ES)

(73) Assignee: Oracle America, Inc., Redwood Shores, CA (US)

( * ) Notice: Subject to any disclaimer, the term of this patent is extended or adjusted under 35 U.S.C. 154(b) by 128 days.

(21) Appl. No.: 12/135,467

(22) Filed: Jun. 9, 2008

(65) Prior Publication Data

US 2009/0022160 A1    Jan. 22, 2009

Related U.S. Application Data

(60) Provisional application No. 60/951,157, filed on Jul. 20, 2007.

(51) Int. Cl.
*H04L 12/28* (2006.01)
(52) U.S. Cl. .................................. 370/395.42
(58) Field of Classification Search ........................ None
See application file for complete search history.

(56) References Cited

U.S. PATENT DOCUMENTS

| | | | | |
|---|---|---|---|---|
| 6,160,812 A * | 12/2000 | Bauman et al. | | 370/416 |
| 6,587,961 B1 * | 7/2003 | Garnett et al. | | 714/11 |
| 6,674,720 B1 * | 1/2004 | Passint et al. | | 370/235 |
| 6,882,649 B1 | 4/2005 | Gura | | |
| 7,006,501 B1 | 2/2006 | Gura | | |
| 7,239,669 B2 * | 7/2007 | Cummings et al. | | 375/295 |
| 7,274,701 B2 * | 9/2007 | Boduch et al. | | 370/395.4 |
| 7,359,384 B2 * | 4/2008 | Kodialam et al. | | 370/395.4 |
| 7,382,794 B1 * | 6/2008 | Zheng et al. | | 370/412 |
| 2002/0181483 A1 * | 12/2002 | Oki et al. | | 370/413 |
| 2003/0227932 A1 * | 12/2003 | Meempat et al. | | 370/415 |
| 2004/0017804 A1 * | 1/2004 | Vishnu | | 370/386 |

OTHER PUBLICATIONS

T. Anderson, S. Owicki, J. Saxe, and C. Thacker, "High Speed Switch Scheduling for Local Area networks", ACM Trans. Comput. Syst., vol. 11, No. 4, pp. 319-352, Nov. 1993.

N. McKeown, "The iSlip Scheduling Algorithm for Input-queued Switches", IEEE/ACM Transaction on Networking, vol. 7, No. 2, Apr. 1993.

E. Oki, R. Rojas-Cessa, and H.J. Chao, "A Pipeline-Based Maximal-Sized Matching Scheme for High-Speed Input-Buffered Switches", IEICE Transactions on Communications, vol. E85-B, No. 7, pp. 1302-1311, Jul. 2002.

(Continued)

*Primary Examiner* — Chirag G Shah
*Assistant Examiner* — Amarnauth Persaud
(74) *Attorney, Agent, or Firm* — Park, Vaughan, Fleming & Dowler LLP

(57) ABSTRACT

Embodiments of a scheduler for a switch, where the switch is configured to couple input ports to output ports are described. During operation, the scheduler may determine a schedule based on a group of requests, associated with multiple data streams, that are received for the output ports of the switch, where the schedule matches input ports to output ports of the switch for a given data cell time. Note that the schedule may be determined using an arbitration technique during a time interval. Moreover, the scheduler may assign an additional request, which was received at a time that precedes a current time by less than the time interval, to a portion of the switch which is available in the schedule, thereby reducing a latency of the scheduler.

20 Claims, 12 Drawing Sheets

OTHER PUBLICATIONS

Y. Tamir and H. C. Chi, "Symmetric Crossbar Arbiters for VLSI Communication Switches", IEEE Transactions on Parallel and Distributed Systems, vol. 4, issue 1, pp. 13-27, Jan. 1993.

H. J. Chao and J. S. Park, "Centralized Contention Resolution Schemes for a Large-Capacity Optical ATM switch", Proc. IEEE ATM Workshop '97, Fairfax, VA, May 1998.

R. Drost, R. D. Hopkins and I. Sutherland, "Proximity Communication", IEEE Custom Integrated Circuits Conference, pp. 469-472, Sep. 2003.

H. Eberle, A. Chow, B. Coates, J. Cunningham, R. Drost, J. Ebergen, S. Fairbanks, J. Gainsley, N. Gura, R. Ho, D. Hopkins, A. Krishnamoorthy, J. Lexau, W. Olesinski, J. Schauer, and T. Ono, "Multiterabit Switch Fabrics Enabled by Proximity Communication", Symposium on High Performance Chips (Hot Chips '07), Stanford, CA, Aug. 19-21, 2007.

I. Elhanany, and X. Li, "A Scalable Frame-based Multi-crosspoint Packet Switching Architecture", High Performance Switching and Routing Conference (HPSR '07), Brooklyn, New York, May 30-Jun. 1, 2007.

C. Minkenberg, I. Iliadis and F. Abel, "Low-latencey Pipelined Crossbar Arbitration", IEEE Global Telecommunications Conference 2004 (Globecom '04), vol. 2, pp. 1174-1179, Nov. 2004.

W. Olesinski, H. Eberle, and N. Gura, "PWWFA: Parallel Wave Front Arbiter for Large Switches", High Performance Switching and Routing Conference (HPSR '07), Brooklyn, NY, May 30-Jun. 1, 2007.

Y. Tian, X. Tu, L. Wen, K. Wang, and Y. Liu, "PPAwFE: a Novel High Speed Crossbar Scheduling Algorithm", Proceedings of the 2005 International Conference on Communications, Circuits and Systems, vol. 1, pp. 673-677, May 2005.

W. Olesinski, N. Gura, H. Eberle, and A. Mejia, "Low-latency scheduling in large switches," Proceedings of the 3rd ACM/IEEE Symposium on Architecture for networking and communications systems, pp. 87-96, 2007.

\* cited by examiner

```
                                        ┌─ 1000
┌─────────────────────────────────────────────────────────────────┐
│  DETERMINE A SCHEDULE FOR A GROUP OF REQUESTS, ASSOCIATED WITH  │
│   MULTIPLE DATA STREAMS, THAT ARE RECEIVED FOR OUTPUT PORTS OF A│
│  SWITCH, WHERE THE SCHEDULE MATCHES INPUT PORTS TO OUTPUT PORTS │
│  OF THE SWITCH FOR A GIVEN DATA CELL TIME, AND WHERE THE SCHEDULE│
│  IS DETERMINED USING AN ARBITRATION TECHNIQUE DURING A TIME     │
│                          INTERVAL                               │
│                            1010                                 │
└─────────────────────────────────────────────────────────────────┘
                                 │
                                 ▼
┌─────────────────────────────────────────────────────────────────┐
│  ASSIGN AN ADDITIONAL REQUEST, WHICH WAS RECEIVED AT A TIME THAT│
│    PRECEDES A CURRENT TIME BY LESS THAN THE TIME INTERVAL, TO A │
│   PORTION OF THE SWITCH WHICH IS AVAILABLE IN THE SCHEDULE,     │
│          THEREBY REDUCING A LATENCY OF THE SCHEDULER            │
│                            1012                                 │
└─────────────────────────────────────────────────────────────────┘
```

FIG. 10

"LOW-LATENCY SCHEDULING IN LARGE SWITCHES"

LOW-LATENCY SCHEDULING IN LARGE SWITCHES

CROSS REFERENCE TO RELATED APPLICATIONS

This application claims priority under 35 U.S.C. 119(e) to U.S. Provisional Application Ser. No. 60/951,157, entitled "Low-Latency Scheduling in Large Switches," by Hans Eberle, Nils Gura, Wladyslaw Olesinski, and Andres Mejia, filed on Jul. 20, 2007, the contents of which are herein incorporated by reference.

This application is related to a pending U.S. patent application Ser. No. 11/731,590, entitled "Parallel-Wrapped Wavefront Arbiter," by Wladyslaw Olesinski, Hans Eberle, and Nils Gura, filed on Mar. 29, 2007, the contents of which are herein incorporated by reference.

BACKGROUND

1. Field of the Invention

The present invention relates to schedulers and techniques for communicating signals through switches. More specifically, the present invention relates to a technique for determining a schedule for a switch.

2. Related Art

Large switches with hundreds of input and output ports and terabit-per-second throughput use schedulers (which are sometimes referred to as 'arbiters') to match input ports with output ports to forward data at high rates. In switches where the data is partitioned into fixed-size data packets (or data cells), one of the main challenges in designing a scheduler is to provide a maximal matching between the input ports and the output ports for every data cell transmission time (which is sometimes referred to as a slot).

However, because data-cell sizes tend to remain constant, as link data rates increase the corresponding slot size decreases. Consequently, the scheduler may have less time to determine a maximal matching for data cells arriving at the input ports. Moreover, determining a schedule for a switch with a large number of input ports and output ports is further complicated because the computation time increases significantly as the total number of ports increases. In many existing switches, these problems are addressed using complicated schedulers that require a significant amount of time to determine the maximal matching between input ports and output ports.

Additionally, when executing applications that require tight coupling between computation nodes, low latency is important. Typically, communication networks are engineered such that switches operate under light load most of the time to avoid forwarding delays caused by high loads. Consequently, the latency of a switch operating under a light load can be an important design parameter. Unfortunately, it can be difficult to achieve a low latency under a light load using a complicated scheduler.

Hence, what is needed are schedulers and techniques for determining a schedule for a switch without the problems described above.

SUMMARY

One embodiment of the present invention provides a scheduler for a switch, where the switch is configured to couple input ports to output ports. During operation, the scheduler may determine a schedule based on a group of requests, associated with multiple data streams, that are received for the output ports of the switch, where the schedule matches input ports to output ports of the switch for a given data cell time. Note that the schedule may be determined using an arbitration technique during a time interval. Moreover, the scheduler may assign an additional request, which was received at a time that precedes a current time by less than the time interval, to a portion of the switch which is available in the schedule, thereby reducing a latency of the scheduler.

In some embodiments, if the additional request is assigned to the portion of the switch, the additional request is excluded from schedules determined using the arbitration technique.

In some embodiments, the multiple data streams are received on the input ports.

In some embodiments, the time interval is greater than the given data cell time.

In some embodiments, the assignment of the additional request is based on a fast-scheduling technique. Moreover, the fast-scheduling technique may involve a leave-one scheme in which the additional request can be granted even if there is a conflict involving more than one request for the portion of the switch. Note that the conflict may be resolved using a cascaded tree of binary arbiters. Additionally, resolution of the conflict may be based on previous conflict-resolution decisions.

However, in some embodiments the fast-scheduling technique involves a remove-all scheme in which the additional resource request is granted if there is only one request for the portion of the switch and the portion of the switch is not included in the schedule.

In some embodiments, the schedule is further determined based, at least in part, on the assignment of the additional request.

Moreover, in some embodiments the portion of the switch includes one or more output ports.

In some embodiments, the arbitration technique involves pipelined calculations of multiple schedules associated with corresponding data cell times, and a calculation of a given schedule is completed during each data cell time. For example, the arbitration technique may be based on a parallel-wrapped wave front arbiter (PWWFA).

In some embodiments, the assignment of the additional request is disabled if a load on the scheduler exceeds a predetermined threshold. Moreover, the latency of the scheduler may be reduced for loads on the scheduler that are less than the predetermined threshold.

In some embodiments, the additional request was received during a data cell time that immediately precedes a current data cell time.

In some embodiments, the sharing of the switch is based on: a fairness of the sharing of the switch between multiple data streams; a utilization of switch resources; a priority allocation; and/or a bandwidth allocation.

Another embodiment provides a method including at least some of the above-described operations of the scheduler.

Another embodiment provides a computer-program product that facilitates the above-described operations of the scheduler.

Another embodiment provides a switch that includes the scheduler.

Another embodiment provides a computer system that includes the switch.

BRIEF DESCRIPTION OF THE FIGURES

FIG. 10 is a flowchart illustrating a process for scheduling a switch in accordance with an embodiment of the present invention.

Figure 1:
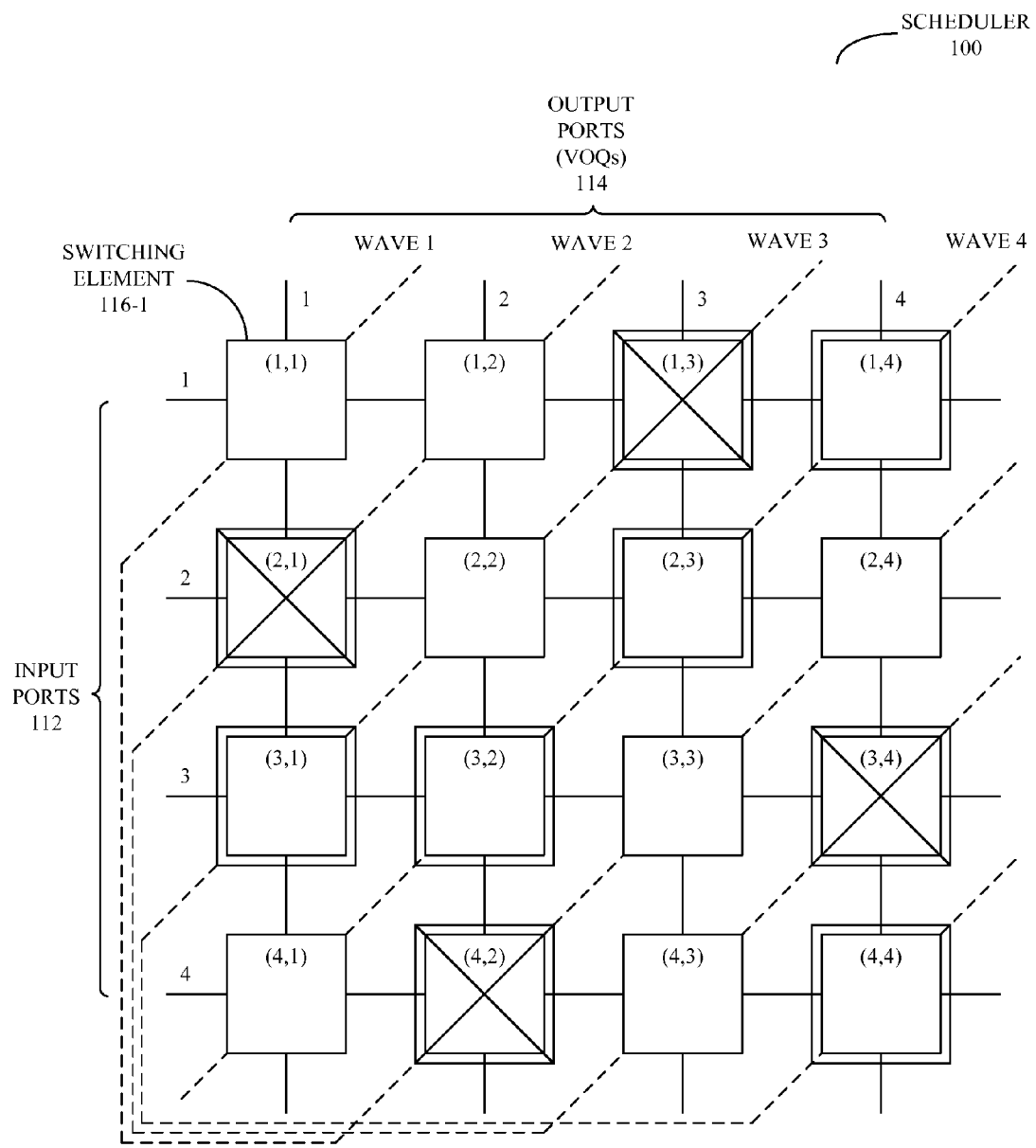
FIG. 1 is a block diagram illustrating a scheduler in accordance with an embodiment of the present invention.

Table 1 provides an illustration of parallel processing in a scheduler in accordance with an embodiment of the present invention.

Table 2 provides an illustration of a determined schedule in accordance with an embodiment of the present invention.

Table 3 provides an illustration of a truth table in accordance with an embodiment of the present invention.

Table 4 provides an illustration of a truth table in accordance with an embodiment of the present invention.

Note that like reference numerals refer to corresponding parts throughout the drawings.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Embodiments of a computer system, a switch, a scheduler, a method, and a computer-program product (i.e., software) for use with the scheduler are described. These devices, systems and processes may be used to determine a schedule that matches input ports with requests, associated with multiple data streams, for output ports for forwarding data in a large switch (such as one with many matrix or switching elements) with low latency. In particular, the scheduler may determine a schedule over a time interval that is greater than a data cell time (or slot) using an arbitration technique, such as one based on a parallel-wrapped wave front arbiter (PWWFA). (However, in some embodiments the schedule is determined over a time interval that is less than or equal to the data cell time.) More generally, the arbitration technique may involve pipelined calculations of multiple schedules associated with corresponding slots, and a calculation of a given schedule may be completed during each slot. Note that the requests for the output ports may be received synchronously (such as prior to the determination of the schedule) and/or asynchronously (for example, prior to and/or during the determination of the schedule).

Additionally, the scheduler may assign an additional request, which was received at a time that precedes a current time by less than the time interval, to a portion of the switch which is available in the schedule using a fast-scheduling technique. For example, the fast-scheduling technique may involve a leave-one scheme and/or remove-all scheme. In this way, a latency of the scheduler may be reduced (for example, by an order of magnitude), especially at low loads, while the scheduler maximally matches the input ports and the output ports for every slot to ensure: fairness of the sharing of the switch between multiple data streams; a utilization of switch resources; a priority allocation; and/or a bandwidth allocation.

Note that the switch and/or the scheduler may be included in a computer system which is at one location or which is distributed over multiple, geographically dispersed locations. Consequently, instructions and/or data associated with processes or jobs that are executed by the computer system, as well as schedules, may be received and communicated within the computer system over a network, such as: the Internet or World Wide Web (WWW), an intranet, a local area network (LAN) (such as IEEE 802.11 or WiFi), a wide area network (WAN) (such as IEEE 802.16 or WiMAX), a metropolitan area network (MAN), a satellite network, a wireless network (such as a cellular telephone network), an optical network, and/or a combination of networks or other technology enabling communication between computing systems or electronic devices.

Additionally, note that the switch may be used in a variety of applications, including: data centers, networks, and/or computer systems (such as multi-processor computer systems). For example, the switch may be included in a backplane that is coupled to multiple processor blades, or the switch may couple different types of components (such as: processors, memory, I/O devices, and/or peripheral devices). The switch may also perform the functions of: a hub, a bridge, and/or a router. As a consequence, in some embodiments the switch is referred to as an 'intelligent hub' or a 'switching hub.' Furthermore, the switch may operate at one or more layers in the open systems interconnection reference model, such as the physical layer (layer 1), the data link layer (layer 2), and/or the network layer (layer 3). Thus, in some embodiments the switch may include a multi-layer switch.

Moreover, the switch may support a variety of communication protocols, including: Ethernet, IEEE 802.11 (Wi-Fi), token ring, fiber distributed data interface (FDDI), point-to-point protocol (PPP), high-level data link control (HDLC), international telecommunication standardization sector Q.921, frame relay, asynchronous transfer mode (ATM), hyper transport, fibre channel, infiniband, PCI express, international telecommunication standardization sector Q.931, NetBIOS extended user interface (NetBEUI), transmission control protocol (TCP), and/or Internet protocol (IP). Therefore, the switch may support frame or packet switching, where the data units communicated through the switch have a variable size, and/or switching protocols in which the data units have a fixed size (such as data cells). Furthermore, in some embodiments the switch may support point-to-point and/or point-to-multipoint operation, as well as half-duplex and/or full-duplex operation. Note that one or more of these protocols may be implemented in the switch in hardware and/or software. Also note that signals selectively coupled by the embodiments of the switch may include: analog signals, data packets, and/or data streams, which may be binary symbols or encoded symbols (for example, using multiple-pulse amplitude modulation).

We now describe embodiments of a switch and a scheduler for determining a schedule for the switch. FIG. 1 presents a block diagram illustrating a scheduler 100. This scheduler may allocate resources for a switch that has N input ports 112 and N output ports 114, where each input port s (or data source) has N Virtual Output Queues (VOQs). Moreover, each VOQ may store data cells destined for one of the N output ports 114 (or destinations) d. Additionally, for each slot, scheduler 100 may select up to N data cells (one from each input port) and match them with the output ports 114. In some embodiments, for a given slot, an input port can send at most one data cell, and an output port can receive at most one data cell.

In an exemplary embodiment in which scheduler 100 implements, at least in part, PWWFA, scheduler 100 allocates resources for a switch that includes sixteen switching elements, such as switching element 116-1, i.e., the switch is a 4×4 switch. Note that each switching element of this switch may represent one VOQ. Moreover, rows may correspond to input ports 112, and columns may correspond to VOQs (i.e., output ports 114). For example, switching element (2,1) may represents VOQ 1 at input port 2. Additionally, each switching element may contain a request counter $R_{sd}$ that represents the occupancy of $VOQ_{sd}$.

Note that there are N distinct 'waves' in the scheduler 100, each of which includes a set of N conflict-free requests. For example, wave 1 in FIG. 1 includes switching elements (1,1), (4,2), (3,3), and (2,4). Because there is no conflict between these switching elements, the scheduler 100 may process all requests in these switching elements at the same time. Note that after the scheduler 100 processes N waves (for example, starting from wave 1 and proceeding to wave N), a schedule for one slot is calculated.

In some embodiments, when a data cell arrives at $VOQ_{sd}$, counter $R_{sd}$ is incremented, and when a request is granted, $R_{sd}$ is decremented. Additionally, changes to $R_{sd}$ can occur at any time during a scheduling cycle.

Moreover, in some embodiments the scheduler 100 includes up to N independent subschedulers that concurrently process different waves of the PWWFA matrix. This is shown in Table 1, which presents an illustration of parallel processing in a scheduler during which two subschedulers A and B process different waves of the matrix shown in FIG. 1. Initially, subscheduler A starts by processing wave 1, and then proceeds to wave 2, while subscheduler B pauses. Then, for the next two waves, subschedulers A and B process switching elements separated by two waves. Subscheduler A finishes the scheduling cycle on the last wave (wave 4) and produces a schedule. Moreover, subscheduler A starts a new scheduling cycle also from wave 4 (note that beginning the scheduling cycles at different waves may maintain fairness in the schedules). Next, subscheduler B processes wave 4, finishes its scheduling cycle, and produces another schedule.

TABLE 1

|  | Wave | | | | | | | | |
| --- | --- | --- | --- | --- | --- | --- | --- | --- | --- |
| Scheduler A | 1 | 2 | 3 | <u>4</u> | 4 | 1 | 2 | <u>3</u> | 3 |
| Scheduler B | x | x | 1 | <u>2</u> | 3 | <u>4</u> | 4 | 1 | 2 |

Consequently, every two wave times, one of the subschedulers finishes processing the entire switching matrix and creates a schedule. In this way, schedules are created twice as frequently than if only one subscheduler was used. This approach relaxes the timing constraints on the scheduler 100 which are associated with high port data rates and/or small data cells.

In general, scheduler 100 may grant a request at switching element (s,d) if: $R_{sd}$ is greater than zero (i.e., input port s requests output port d); and no grant was issued in row s or column d in any of the preceding waves processed by the same subscheduler (which is described further below).

Note that when a subscheduler grants a request, it may decrement the corresponding $R_{sd}$ counter. This counter may be used later by other subschedulers which process additional sequences of waves. Consequently, the 'preceding wave' condition described above may be understood as any wave processed by a given subscheduler before the current wave since a scheduling cycle began. For example, in FIG. 1 wave 1 precedes waves 2, 3, and 4 that, collectively, will be processed to calculate the schedule. Therefore, the 'preceding wave' condition indicates that if the request in switching element (1,1) received a grant in the wave 1, then requests in switching elements belonging to row 1 or column 1 may not be granted in the subsequent three waves by the same subscheduler. FIG. 1 illustrates an example of a schedule for one subscheduler, where double squares represent requests, and crossed double squares represent requests that were granted.

Figure 2:
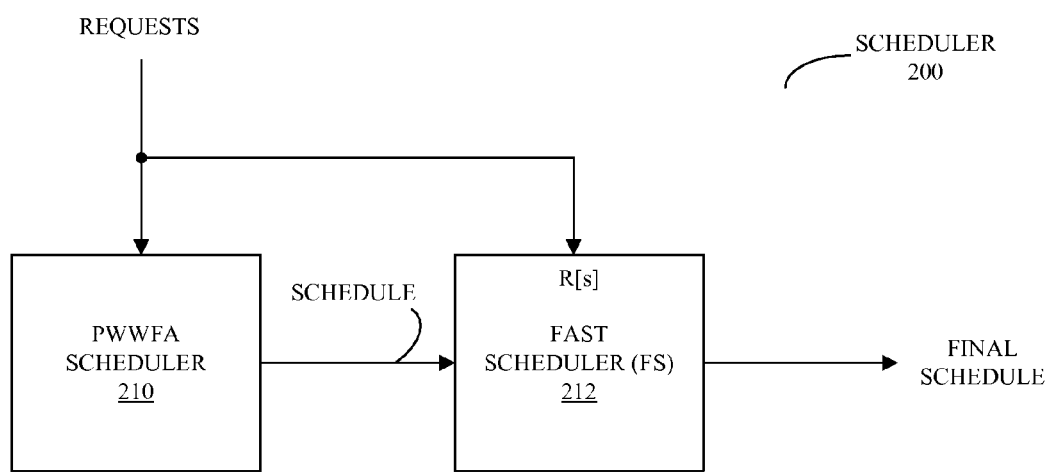
FIG. 2 is a block diagram illustrating a scheduler in accordance with an embodiment of the present invention.

A high-level view of a scheduler, such as the scheduler 100, is shown in FIG. 2, which presents a block diagram illustrating a scheduler 200. This scheduler includes a PWWFA scheduler 210 (as described above with reference to FIG. 1) and a fast scheduler (FS) 212 that augments the schedules created by PWWFA scheduler 210. Note that the FS 212 uses a set of registers R[s] that store the most recent requests.

As described above, each request that arrives at scheduler 200 may increment the request counter $R_{sd}$ in the appropriate PWWFA matrix element. In addition, this request, represented by identifier d of the requested output port, may be stored in one of N registers R[s], where 0<s≦N, and where N is the number of input ports and s is the index for an input port. Note that each R[s] may store only one request, so each new request from an input s may overwrite a previously stored request.

Moreover, for each slot, the PWWFA scheduler 210 may produce a new schedule. While the PWWFA scheduler 210 is calculating this schedule (e.g., while several subschedulers run the waves through the matrix of switching elements), new requests may arrive, but they may either fail to be picked up by the subscheduler working on the respective wave or they may be picked up early by a subscheduler that has several waves to process before completing its schedule. To further illustrate the first point, consider the following example in FIG. 3, which presents a block diagram illustrating another embodiment of scheduler 100.

Assume for simplicity that one subscheduler suffices and that initially, the matrix has requests in switching elements (1,4) and (2,1). This subscheduler processes wave 1 that consists of switching elements (1,1), (4,2), (3,3), and (2,4). None of these switching elements has requests, i.e., $R_{sd}$ equals zero in these four switching elements, so no grant is given.

Now, the subscheduler starts processing the second wave and grants a request in switching element (2,1). While this wave is being processed, a data cell addressed to output port 2 arrives at input port 4. This increments the request counter in switching element (4,2), and sets register R[4] equal to two. However, this request will not be picked up by the subscheduler because this switching element belongs to wave 1 that has already been considered during this scheduling cycle. In fact, the request at switching element (4,2) may not be picked up by scheduler 100 until the next scheduling cycle. This is where FS 212 (FIG. 2) helps. In particular, once the schedule that includes grants for input ports 1 and 2 (for output ports 4 and 1, respectively) is ready, FS 212 (FIG. 2) will augment it with a grant for the request in register R[4].

Note that it is possible that a schedule created using the PWWFA-FS scheduling technique will include a data cell that has already been sent out. Consider the following scenario. A single cell arrives at input port 1. It is addressed to output port 3 (therefore, it is stored in $VOQ_{13}$), and the switch is otherwise empty. This arrival increments counter $R_{13}$ which now equals one, and sets register R[1] equal to three in FS 212 (FIG. 2). Before the PWWFA scheduler 210 (FIG. 2) schedules this request, an empty schedule has been passed from the PWWFA scheduler 210 (FIG. 2) to FS 212 (FIG. 2), which schedules a data cell from $VOQ_{13}$ and resets R[1]. In the embodiment shown in FIG. 2, there is no feedback from FS 212 to the PWWFA scheduler 210 so the PWWFA scheduler 210, which can access only counters $R_{sd}$ in the matrix, does not know that the data cell has already been scheduled by FS 212. In this case, the PWWFA scheduler 210 schedules a data cell that has already been removed from $VOQ_{13}$. This may reduce the bandwidth utilization, because the PWWFA scheduler 210 could have instead scheduled another data cell not scheduled otherwise.

Without any feedback from FS 212 to the PWWFA scheduler 210, each request granted by FS 212 may also be granted by the PWWFA scheduler 210. While this effect may appear to be detrimental to the overall performance of this scheduling technique, two mechanisms may counterbalance its impact. First, FS 212 comes into effect mostly when the load (defined as the number of data cells that arrive per input port) is light and unused bandwidth is abundant, such that a loss in bandwidth utilization can be tolerated to provide lower latency. Second, under heavy load, FS 212 rarely has a chance to augment schedules created by the PWWFA scheduler 210, so the scenario described above may be rare.

Nonetheless, alternative embodiments may synchronize the operation of FS 212 and the PWWFA scheduler 210 to avoid the scenario described above. For example, requests granted by FS 212 can be removed from the matrix in the PWWFA scheduler 210 by subsequently decrementing the appropriate counters $R_{sd}$. Alternatively, these requests may be first sent to FS 212 and may be forwarded to the PWWFA scheduler 210 only if they are rejected by FS 212. While these approaches avoid duplicate grants, the first approach may require a feedback path from FS 212 to PWWFA scheduler, as well as additional logic to decrement the counters $R_{sd}$ and to prevent instances where $R_{sd}$ is less than zero. Moreover, the second approach may add the latency associated with FS 212 to requests processed by the PWWFA scheduler 210. In the discussion that follows, the original approach is used as an illustrative example.

We now describe the FS in more detail. Basically, FS 212 converts the schedule into bit vector representations that may be further manipulated to match requests in registers R[s] in addition to requests scheduled by the PWWFA scheduler 210. Note that some of these operations may be performed concurrently, and efficient bit-vector manipulations may assure their fast execution.

In some embodiments, execution of PWWFA-FS scheduling technique may include the following operations. First, a schedule V and auxiliary bit vectors may be built by the PWWFA scheduler 210. Then, the results may be sent to FS 212, and matching requests in registers R[s] may be pruned. Next, the schedule V may be updated.

When the PWWFA scheduler 210 builds the schedule and auxiliary bit vectors, a subscheduler may move from wave to wave. Moreover, a token of size $\log_2(N)$ bits may be passed from switching element to switching element in each row. If a request is granted, this token may be set to the number of the output port that was granted to a given input port.

Additionally, at the end of the scheduling cycle, these tokens may result in values v[s] stored in the matrix elements which correspond to the last wave of the scheduling cycle. In some embodiments, v[s] equal to d is a binary representation of the output port d matched with input port s, where v[s] equals zero if s was not matched and $0 < s \leq N$. Note that V, which is defined as a vector that includes v[1], v[2], ..., V[N] is in fact a complete schedule created by the PWWFA scheduler 210, whose elements V[s] are distributed among N switching elements on a matrix diagonal.

In some embodiments, the auxiliary bit vectors can be derived from: V[1], V[2], ..., V[N], including: M= $(M_N, \ldots, M_1)$, which is a bit vector that contains a one in position s if input port s was matched by the PWWFA scheduler 210, and a zero otherwise (i.e., $M_s$ equals one if V[s] is non-zero, and $M_s$ equals zero if V[s] equals zero); and U= $(U_N, \ldots, U_1)$, which is a bit vector that contains a one in position d if output port d was matched by the PWWFA scheduler 210, and a zero otherwise (i.e., $U_d$ equals one if, for s, V[s] equals d, and $U_d$ equals zero otherwise).

Figure 3:
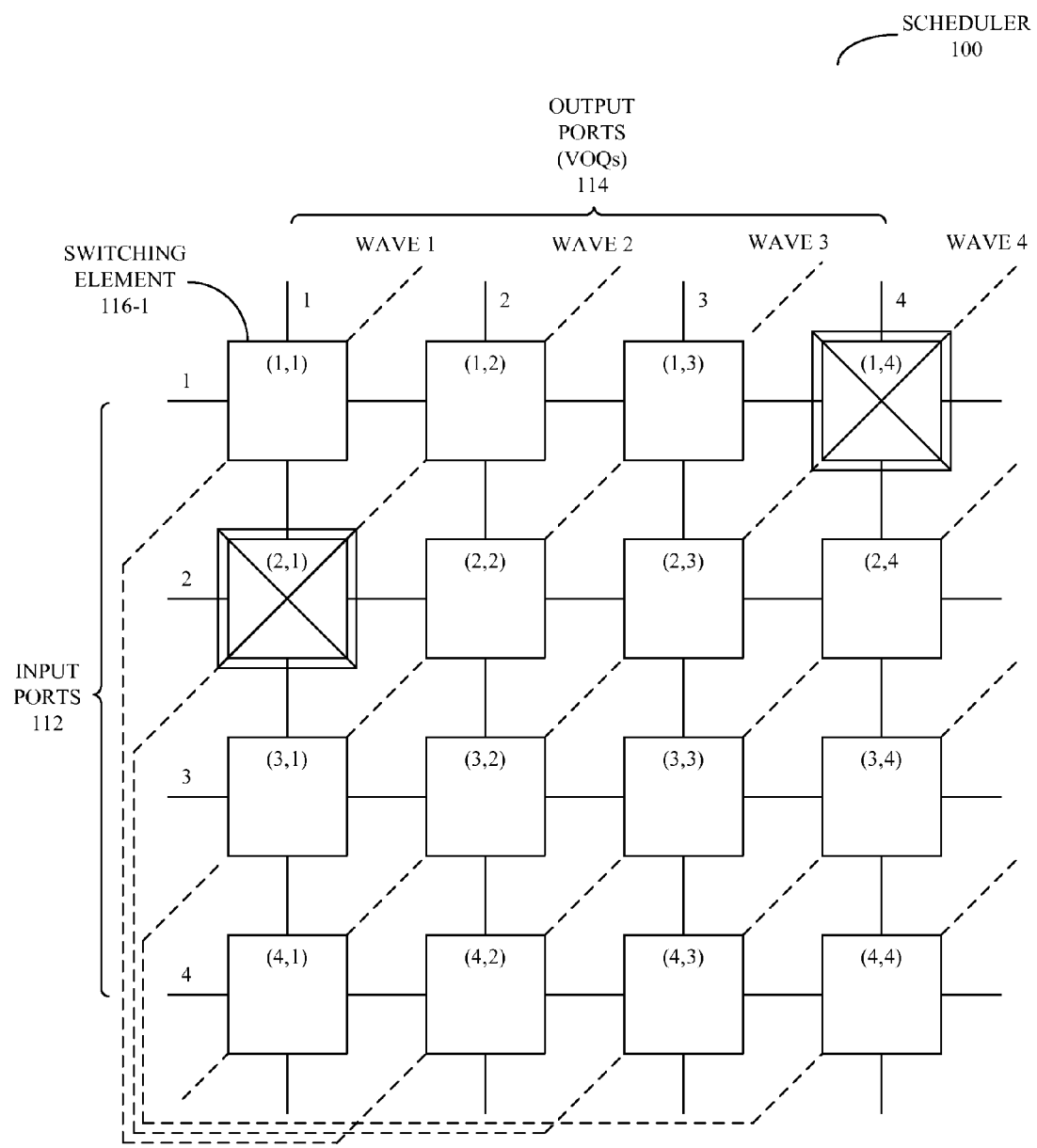
FIG. 3 is a block diagram illustrating a scheduler in accordance with an embodiment of the present invention.

For example, consider the 4×4 matrix from FIG. 3 with granted requests in switching elements (1,4) and (2,1). Table 2, which presents an illustration of a determined schedule, including input ports s, output ports d, V[s], $M_s$, and $U_d$ at the end of the scheduling cycle after the final wave (i.e., after wave 4 has been processed). Note that in this example, input ports 3 and 4 and output ports 2 and 3 have not been matched.

TABLE 2

| Diagonal Elements | Input Ports (s) | Output Ports (d) | Schedule V[s] | $M_s$ | $U_d$ |
| --- | --- | --- | --- | --- | --- |
| (1, 4) | 1 | 4 | 4 | 1 | 1 |
| (2, 3) | 2 | 3 | 1 | 1 | 0 |
| (3, 2) | 3 | 2 | 0 | 0 | 0 |
| (4, 1) | 4 | 1 | 0 | 0 | 1 |

Note that M can be derived from V because each $M_s$ can be computed by comparing V[s] to zero. However, deriving U from V may involve a search through the schedule for each output port d to find a matching s such that V[s] equals to d. Moreover, M and U may be more easily obtained during operation of the PWWFA scheduler 210 (FIG. 2). In particular, after scheduling a wave, each matrix element (s,d) of the wave signals adjacent switching elements if input port s or output port d have been matched. More specifically, matrix element (s,d) signals the switching element to the right, i.e., ((s mod N)+1,d), when input port s has been matched, and it signals the switching element below, i.e., (s, (d mod N)+1), when output port d has been matched. By recording this information during operation of the PWWFA scheduler 210 (FIG. 2), each matrix element (s,d) of the final wave will store V[s], as well as $M_s$ and $U_d$.

When the results are sent to FS 212 (FIG. 2), each diagonal matrix element of the final wave may send input port s, matched output V[s], and bits $M_s$ and $U_d$ to FS 212 (FIG. 2).

When pruning and matching requests in registers R[s], FS 212 (FIG. 2) knows which input ports are eligible to be matched as indicated by the zeros in bit vector M. Moreover, it knows which output ports are eligible to be matched as indicated by zeros in bit vector U. However, there may be input ports that request the same output port, i.e., there may be pairs of input ports $s_i$ and $s_j$ with $R[s_i]$ equal to $R[s_j]$. In the discussion that follows, two techniques for pruning these requests and finding valid matches between unmatched input ports and output ports are described. Both of these techniques convert binary requests R[s] into corresponding one-hot representations $RF_{sd}$, where $RF_{sd}$ equals one if R[s] equals d, and $RF_{sd}$ equals zero otherwise. Therefore, each input port s presents a bit vector $RF_s=(RF_{sN}, \ldots, RF_{s1})$ to FS 212 (FIG. 2). Based on R, RF, M, and U, FS 212 (FIG. 2) computes a conflict-free matching W in binary representation, where, for each input port s, W[s] equals d if s was matched with an output port d, and W[s] equals zero otherwise.

When updating the schedule V, FS 212 (FIG. 2) produces a conflict-free matching W between input ports and output ports not matched by the PWWFA scheduler 210 (FIG. 2), which means that the sets of input ports and the sets of output ports matched in V and W are disjoint. Therefore, updating the original schedule V with the augmentation W may be trivial. In particular, for each input port s, the final schedule X[s] may be defined as X[s] equal to V[s] if V[s] is not equal to zero, and X[s] equal to W[s] otherwise. Note that this operation can be implemented as a bit-wise OR of V and W. For example, if the addition by FS 212 (FIG. 2) to the schedule shown in Table 2 is W[3] equal to 2, the complete, augmented schedule is X=(1,4), (2,1), (3,2), (4,0).

We now describe embodiments of pruning multiple requests for the same output port. In general, conflicts among the requests in registers R[s] have to be resolved quickly in the process of augmenting the schedule produced by the PWWFA scheduler 210 (FIG. 2). In this regard, the primary goal of FS 212 (FIG. 2) is low scheduling latency. Note that the scheduling latency accounts for a large portion of the overall forwarding delay specifically under light load (under heavy load, queuing delays tend to dominate). Therefore, in some embodiments FS 212 (FIG. 2) is simple enough to make a scheduling decision in significantly less time than the PWWFA scheduler 210 (FIG. 2). Ideally, FS 210 (FIG. 2) is simple enough to be implemented in hardware that can make a scheduling decision during a slot (however, in general either the PWWFA scheduler 210 in FIG. 2 and/or FS 212 in FIG. 2 may be implemented in hardware and/or software). These scheduling decisions may not be optimal or work-conserving, and can exploit the assumption that the load is low. Moreover, fairness in granting requests between the input ports may be a secondary consideration.

In some embodiments, the pruning technique removes all requests that cause conflicts (which is henceforth referred to as a 'remove-all' technique), while in other embodiments, the pruning technique removes all but one request for the same output port (which is henceforth referred to as a 'leave-one' technique). In the remove-all technique, FS 212 (FIG. 2) may augment a schedule calculated by the PWWFA scheduler 210 (FIG. 2) by granting requests to those output ports that have exactly one request and which were not scheduled by the PWWFA scheduler 210 (FIG. 2). If an output port d receives exactly one request (i.e., there is a unique input port s with R[s] equal to d), the request is granted and input port s can send its data cell immediately. However, if there are multiple requests for an output port, all of the requests are rejected and these requests have to wait to be scheduled by the PWWFA scheduler 210 (FIG. 2). While this pruning technique may leave outputs unmatched that could be matched, it is easy to implement and performs well under light load (as described further below with reference to FIGS. 7-9).

Figure 4:
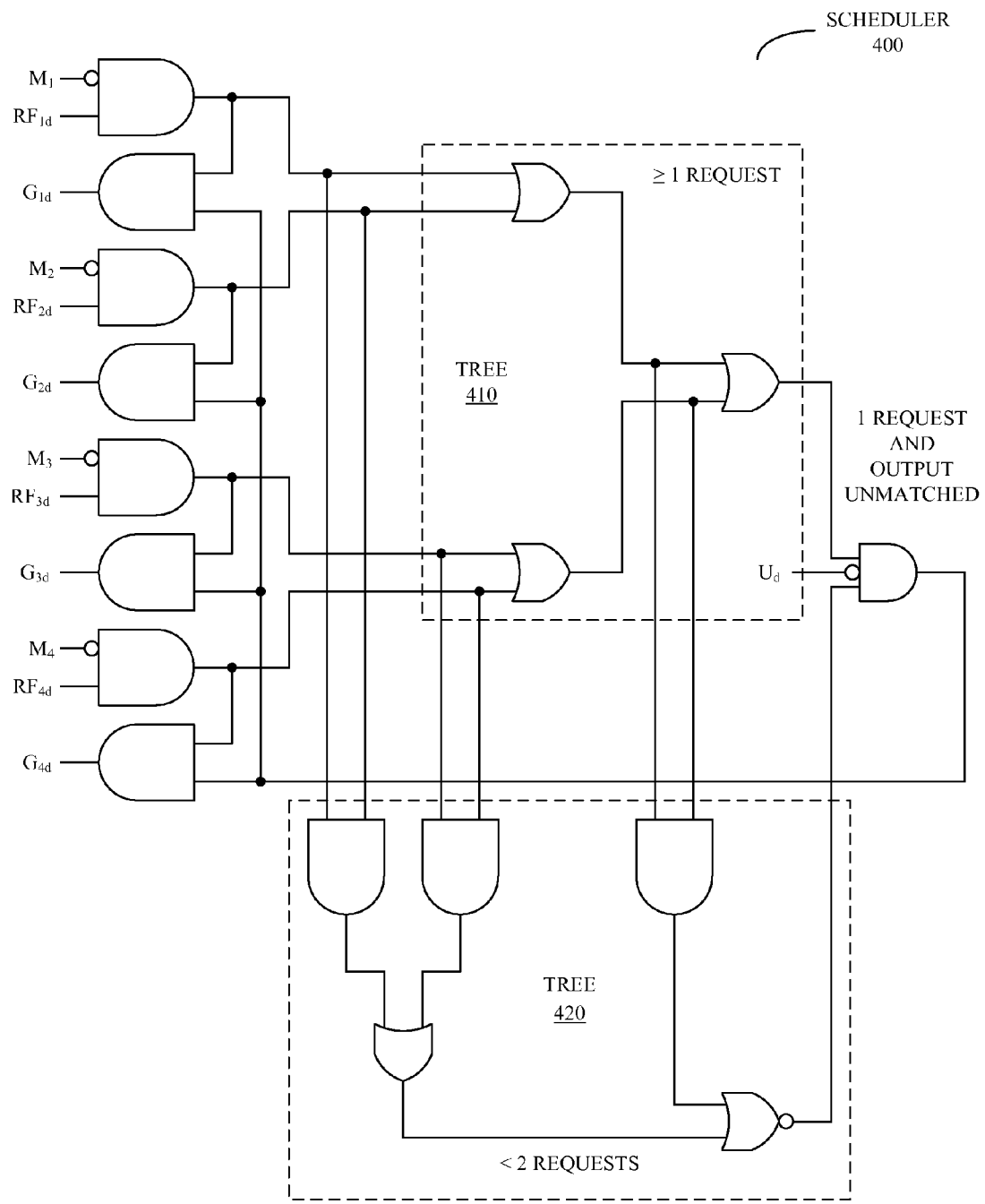
FIG. 4 is a block diagram illustrating a scheduler in accordance with an embodiment of the present invention.

FIG. 4 presents a block diagram illustrating a scheduler 400, such as FS 212 (FIG. 2), that includes an embodiment of a 'remove-all' technique for one output port d of a 4×4 switch. In particular, requests $RF_{1d}$, $RF_{2d}$, $RF_{3d}$, and $RF_{4d}$ from input ports 1, 2, 3, and 4 to output port d may be first masked with bit vector M to eliminate those input ports that have already been scheduled by the PWWFA scheduler 210 (FIG. 2). Then, the remaining requests are processed in two binary tree structures. The first tree 410, consisting of OR-gates, may determine if there is at least one request and the second tree 420, consisting of one layer of AND-gates and a subtree of OR-gates, may determine if there is at most one request. If both conditions are satisfied and the output port has not been matched by the PWWFA scheduler 210 (FIG. 2) as indicated by bit $U_d$, scheduler 400 grants the output port d to the input port s that had the request. Note that because a grant implies that there was one unique input with a request, the grant signal is simply broadcast to all input ports. These input ports mask the grant signal with their request signal and the unique input port s that had the request receives a grant $G_{sd}$. Moreover, because there is one 'remove-all' scheduler for each output port, each input port receives N grant signals $G_{s1}$ through $G_{sN}$, of which only one can be set. Each input port s may merge $G_{s1}$ through $G_{sN}$ in a tree of OR-gates or with a wired OR into $G_s$ equal to $G_{s1}$ OR $G_{s2} \ldots$ OR $G_{sN}$. Next, input port s may set W[s] equal to R[s] if $G_s$ is equal to one, and W[s] equal to zero if $G_s$ is equal to zero.

Note that scheduler 400 provides fairness among all input ports because either all requests are rejected or one is granted, but no request is ever chosen over another one. In this case, the resolution of conflicts is deferred to the PWWFA scheduler 210 (FIG. 2).

Scheduler 400 may be simple to implement in hardware and may be easy to analyze in size and delay. In particular, the size of the circuit can be estimated by calculating the number of 2-input gates of a scheduler for one output port in an N-port switch. For a switch with N ports, there are N AND-gates to mask the requests RF with the vector of matched input ports M. Note that the tree structure that detects the presence of at least one request may include N−1 OR-gates. Similarly, the structure to test for two requests to the same output port may include N−1 AND-gates and a subtree of N−2 OR-gates. Adding two AND-gates to merge the outputs of the two tree structures and N AND-gates for masking the global grant signal, this scheduler may include 5N−2 2-input gates for each output-port scheduler. Assuming a tree of N−1 OR-gates for each input port s to merge $G_{s1}$ through $G_{sN}$, the total number of 2-input gates for an N-output scheduler is $6N^2-3N$. In an exemplary embodiment of a 256×256-port switch, this scheduler may include 392,448 gates.

While the size of scheduler 400 grows quadratically with the number of ports, the use of tree structures leads to only a logarithmic growth in logic delay. Moreover, the longest path includes: one request-masking AND-gate ($M_s$ AND $R_{sd}$), the '<2 requests' tree, the merging AND-gate, the grant-masking AND-gate, and the grant-merging OR-tree. It passes through $2 \log_2(N)+4$ gates. Note that while the delay estimates are based on the number of logic levels, in some embodiments the performance of the 'remove-all' technique for large port counts may also depend on: data locality, fanouts, and associated wire delay. However, compared to the scheduling latency of the PWWFA technique, which grows linearly with the port count N, the delay of the 'remove-all' technique may grow more slowly. Consequently, scheduling decisions may be made significantly faster especially for a large number of ports.

In the 'leave-one' technique, FS 212 (FIG. 2) may consider multiple requests for a given output port and may accept one of the conflicting requests. In this case, the arbitration of the requests is performed in a tree structure of binary arbiters.

Figure 5A:
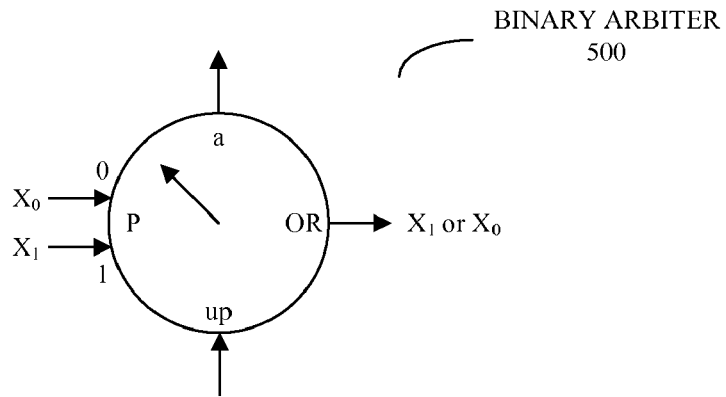
FIG. 5A is a block diagram illustrating a binary arbiter in accordance with an embodiment of the present invention.
Figure 5B:
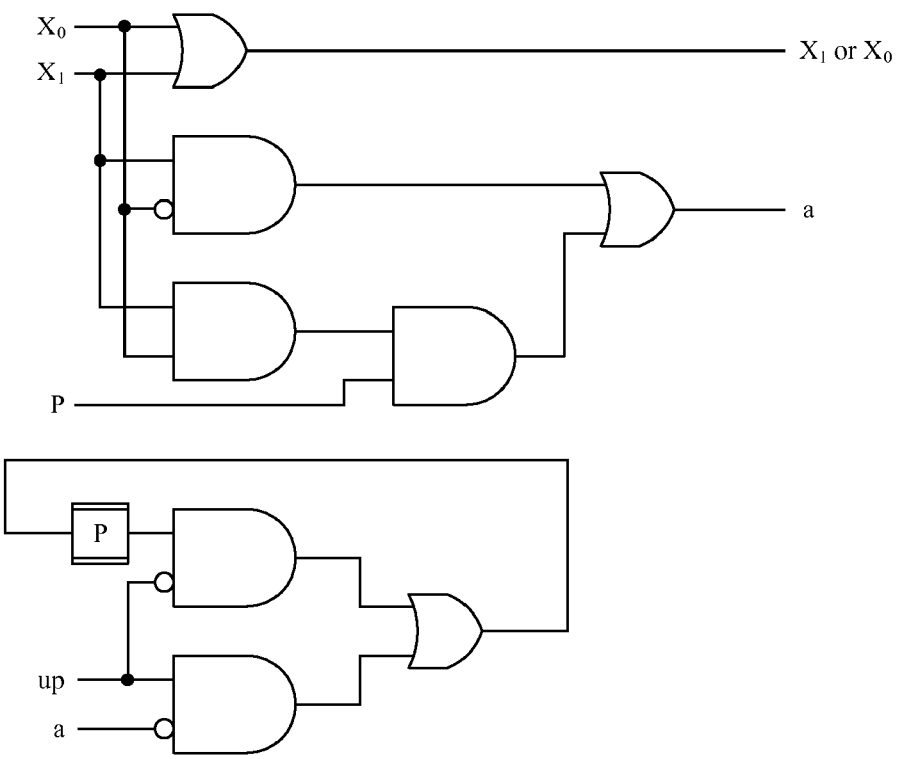
FIG. 5B is a block diagram illustrating a binary arbiter in accordance with an embodiment of the present invention.

FIG. 5A presents a block diagram illustrating a binary arbiter 500, and FIG. 5B presents a block diagram illustrating a gate-level implementation of binary arbiter 500 (corresponding truth tables are shown in Tables 3 and 4). This scheduler has three inputs: two request inputs $X_0$ and $X_1$, and an update input up. Moreover, binary arbiter 500 also has an internal state in the form of priority bit P represented by an arrow pointing to the request input of higher priority. Note that bits $X_0$ and $X_1$ represent the input ports that compete for grants, and priority P is used to resolve conflicts when both inputs request the output port simultaneously, i.e., when they compete for a grant from the same output port. In addition, note that the update input up controls the updating of priority register P.

TABLE 3

| $X_1$ | $X_0$ | P | $X_1$ OR $X_0$ | a |
|---|---|---|---|---|
| 0 | 0 | 0 | 0 | 0 |
| 0 | 0 | 1 | 0 | 0 |
| 0 | 1 | 0 | 1 | 0 |
| 0 | 1 | 1 | 1 | 0 |
| 1 | 0 | 0 | 1 | 1 |
| 1 | 0 | 1 | 1 | 1 |
| 1 | 1 | 0 | 1 | 0 |
| 1 | 1 | 1 | 1 | 1 |

TABLE 4

| up | a | $P_{old}$ | $P_{new}$ |
|---|---|---|---|
| 0 | 0 | 0 | 0 |
| 0 | 0 | 1 | 1 |
| 0 | 1 | 0 | 0 |
| 0 | 1 | 1 | 1 |
| 1 | 0 | 0 | 1 |
| 1 | 0 | 1 | 1 |
| 1 | 1 | 0 | 0 |
| 1 | 1 | 1 | 0 |

One of the outputs of the binary arbiter is the logical OR of bits $X_0$ and $X_1$, and the other output (which is referred to as address bit a) indicates which request has been granted. Because multiple requests can compete for the same output port, this bit may be used at every level of the tree in order to keep track of the origin of the granted request. Moreover, as indicated in Table 3, when both inputs $X_0$ and $X_1$ request the same output port, the selection of the request to be granted depends on the value of the priority bit P. In some embodiments, to provide fairness, the internal priority bit P can be updated by asserting up, which is described further below with reference to FIG. 6.

Figure 6:
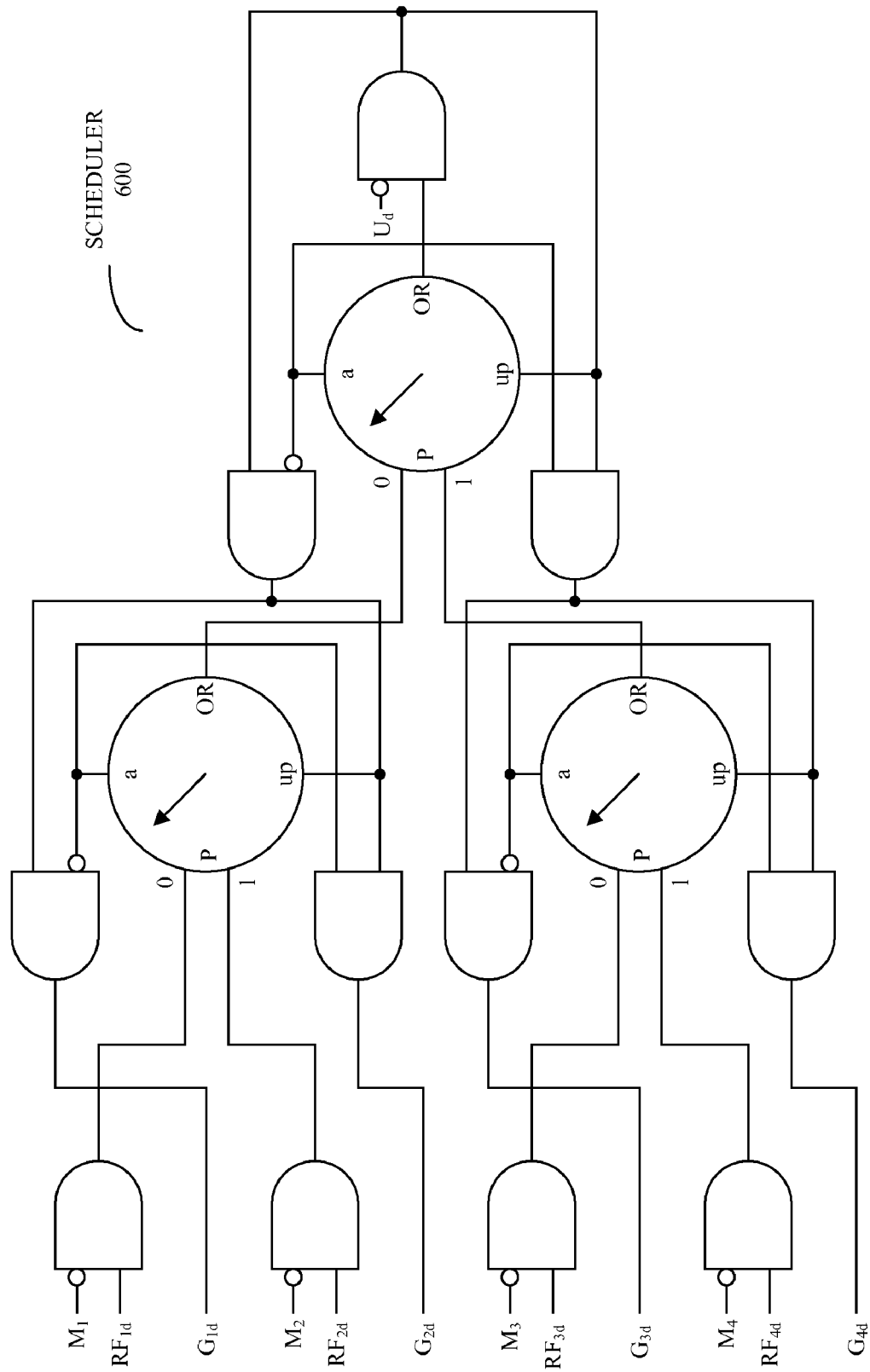
FIG. 6 is a block diagram illustrating a scheduler in accordance with an embodiment of the present invention.

FIG. 6 presents a block diagram illustrating a scheduler 600 that includes an embodiment of a 'leave-one' technique for one output port d of a 4×4-switch. As in the 'remove-all' technique, the requests $RF_{1d}$, $RF_{2d}$, $RF_{3d}$, and $RF_{4d}$ may be first masked with bit vector M to eliminate requests from input ports already scheduled by the PWWFA scheduler 210 (FIG. 2). Then, the remaining requests may be forwarded to a tree of binary arbiters. Each of the binary arbiter determines if there was a request on at least one input port as indicated by output OR. Depending on priority P, the binary arbiter further determines which input port should receive the grant as indicated by address output a.

At the root binary arbiter on the right, the output of the OR-tree indicates if there was a request from at least one input port. This signal is masked with bit $U_d$ to ensure that output port d did not receive a grant from the PWWFA scheduler 210 (FIG. 2). If there is at least one request and output port d was not scheduled by the PWWFA scheduler 210 (FIG. 2), the binary arbiter sends a grant signal through an inverse tree of AND-gates to exactly one input port s. Moreover, at each binary arbiter, or node of the tree, the grant signal is either forwarded to the upper or lower branch of the tree as determined by the local address bit a. In this way, the binary arbiter constructs a path from the root of the tree to the granted input port s, which receives a grant signal $G_{sd}$. Similar to the 'remove-all' technique, there is one binary arbiter in scheduler 600 for each output port d such that each input port s receives N grant signals $G_{s1}$ through $G_{sN}$. Note that because input port s submits only one request R[s] to one output port, only one of the grant signals can be set and they can be merged in a tree of OR-gates or with a wired OR into $G_s$ equal to $G_{s1}$ OR $G_{s2}$ ... OR $G_{sN}$. Next, input port s may set W[s] equal to R[s] if $G_s$ equals one, and W[s] equal to zero if $G_s$ equals zero.

To provide some level of fairness between competing inputs ports, the 'leave-one' scheduler 600 updates the priority bits of all binary arbiters on the path from the root arbiter on the right to the granted input port on the left after each arbitration cycle that resulted in a grant. Then, the priority bits P on the path to the granted input port point away from the granted input port such that this input port has the lowest priority of all input ports in the next scheduling cycle. In other embodiments, random values may be assigned to the priority bits P of all binary arbiters after each arbitration cycle that resulted in a grant.

Note that while both approaches with deterministic and random assignment of priorities P are easy to implement and work well for most traffic patterns, the tree structure of scheduler 600 can lead to unfairness under specific traffic patterns. In particular, if many requests frequently originate from the same subtree of scheduler 600 and few requests from another subtree, the latter ones receive grants disproportionately more often. For example, if in scheduler 600 requests $RF_{1d}$, $RF_{2d}$, and $RF_{4d}$ were always set, $RF_{4d}$ would be granted half of the time and $RF_{1d}$ and $RF_{2d}$ one quarter of the time each. However, this unfairness is expected to have little impact under low load, and under high load, most requests will be processed by the PWWFA scheduler 210 (FIG. 2), thereby hiding the unfairness of a 'leave-one' FS.

We now estimate the size and logic delay of the circuit based on 2-input gates in order to compare the 'leave-one' technique with the 'remove-all' technique. For a switch with N ports, there are N binary arbiters, one for each output port. Each of these binary arbiters may use N AND-gates to mask the requests RF with the vector of matched input ports M. Note that the tree of binary arbiters may include N−1 binary arbiters with 8 gates and one register bit each, and that the inverse AND-tree (including the masking gate for $U_d$) may include 2N−1 AND-gates. Moreover, the N input ports may each use a tree of N−1 OR-gates to merge grant signals $G_{s1}$ through $G_{sN}$. Therefore, the total number of gates for an N-output-port scheduler is $12N^2-10N$ and the number of register bits is $N^2-N$. In an exemplary embodiment, for a 256×256 switch, the 'leave-one' technique includes: 256 8-level trees with 255 binary arbiters each, a total number of 783,872 2-input gates, and 65,280 register bits.

Note that the logic delay is mainly determined by the delay of the three tree structures. Moreover, the longest path includes: the masking AND-gates, the OR-tree in the binary arbiters (except the root binary arbiter), three gates to generate address bit a in the root binary arbiter, the inverse tree of AND-gates, and the grant-merging OR-tree. Therefore, the total logic delay is equivalent to $3\log_2(N)+3$ gates. Additionally, note that the largest fanout of the 'leave-one' technique is 3 gates independent of the number of ports N. This makes the 'leave-one' technique amenable to high-speed hardware implementations even for large configurations.

As the preceding embodiments have shown, the 'remove-all' technique and the 'leave-one' technique can be implemented simply. Consequently, the operations in these techniques can be executed using elementary logical operations on bit vectors. In addition, most operations for pruning and matching can be based on tree structures that grow logarithmically in delay with the number of ports.

We now describe simulations of embodiments of a scheduler that includes a FS. In these simulations, the average delay (including queuing delay) of: a PWWFA scheduler, a PWWFA-FS scheduler in which all conflicting requests for the same output port are rejected (PWWFA-FS with a 'remove-all' technique), and a PWWFA-FS scheduler in which one of the conflicting requests is considered (PWWFA-FS with a 'leave-one' technique).

Simulation results were obtained with a 95% confidence interval, not greater than 1% for the average delay. These simulations were based on: a switch with N equal to 256 ports, a data cell L equal to 128 B, a link data rate C equal to 10 Gbps, a FS delay of 20 ns, and 10 PWWFA subschedulers. Moreover, data traffic was Bernoulli distributed with bursty, on-off traffic, in which 'on' periods and 'off' periods were exponentially distributed. Note that the 'on' period $t_{on}$ had a mean length of 10 data cells, and the mean length of the 'off' period $t_{off}$ was adjusted depending on load $\lambda$ based on $t_{off}=t_{on}\times(1-\lambda)/\lambda$.

Figure 7A:
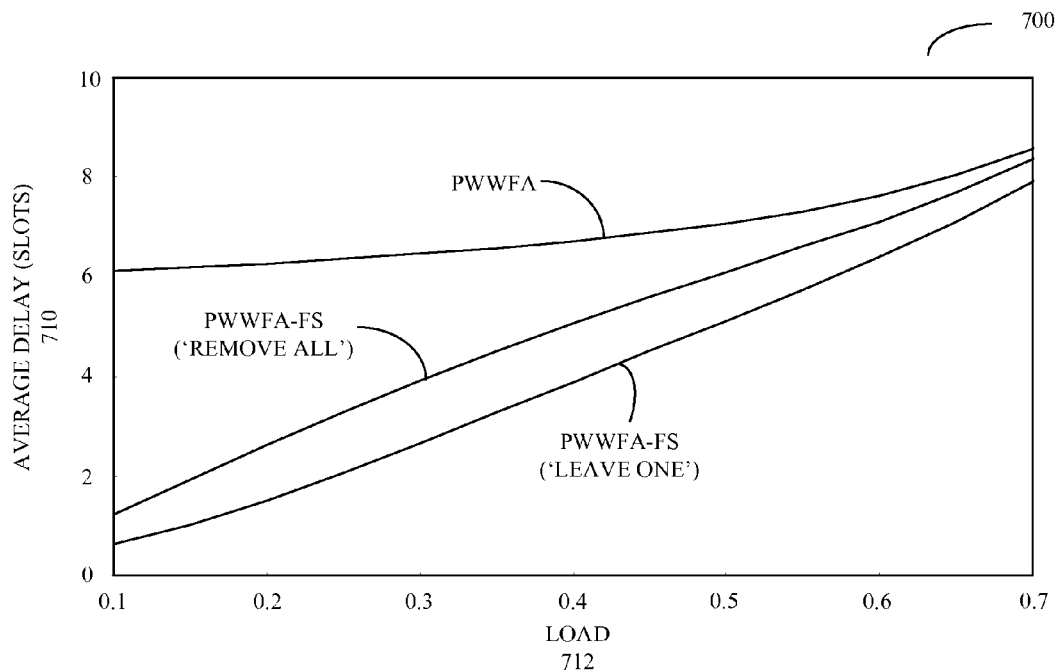
FIG. 7A is a graph of average delay as a function of load for a scheduler in accordance with an embodiment of the present invention.
Figure 7B:
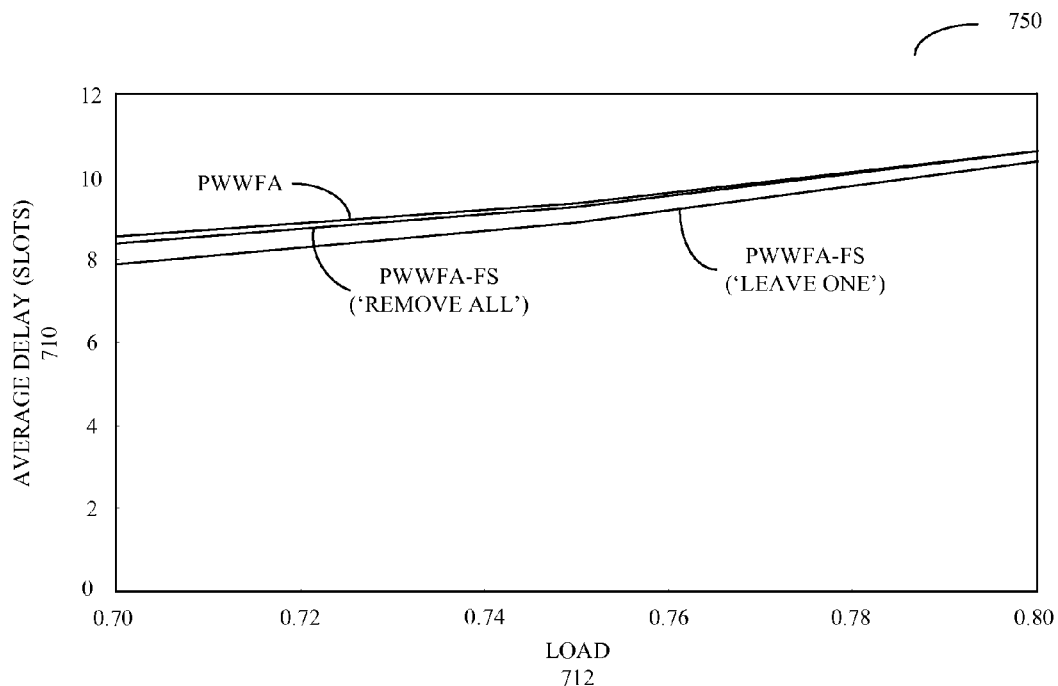
FIG. 7B is a graph of average delay as a function of load for a scheduler in accordance with an embodiment of the present invention.
Figure 8:
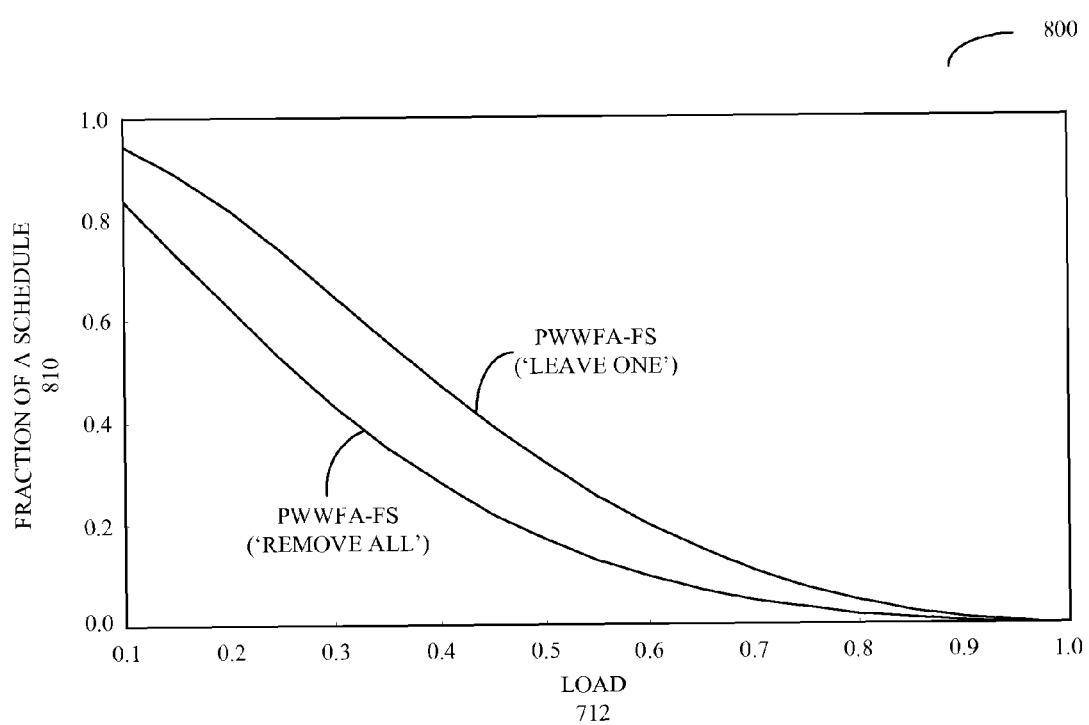
FIG. 8 is a graph of schedule filling as a function of load for a scheduler in accordance with an embodiment of the present invention.

FIG. 7A presents a graph 700 of average delay 710 (in slots) as a function of (light) load 712 for a scheduler, and FIG. 7B presents a graph 750 of average delay 710 (in slots) as a function of (heavy) load 712 for the scheduler. Note that the differences between PWWFA and the PWWFA-FS scheduling techniques are significant. In particular, for the lowest load of 0.1, the PWWFA scheduling technique has a latency of 6.13 slots (equivalent to a delay of 628 ns, of which 512 ns is associated with waves traversing the PWWFA matrix), while the PWWFA-FS 'remove-all' scheduling technique has a latency of 1.24 slots (127 ns), which is nearly 5 times less than the latency of the PWWFA scheduling technique. Moreover, the PWWFA-FS 'leave-one' scheduling technique lowers the latency further to 0.62 slots (64 ns) under a load of 0.1, which is nearly 10 times less than the latency of the PWWFA scheduling technique. Note that all of the simulated results converge with increasing loads, decreasing the benefits of the FS. However, even at loads between 0.5-0.7, the advantages of FS scheduling techniques are still visible.

As expected, the FS scheduling techniques perform best under light loads, i.e., when a schedule produced by the PWWFA scheduler in the PWWFA-FS scheduling technique has many unmatched input ports and output ports. This is when the FS has the highest chance to add new matches. This is confirmed in the simulation results shown in FIG. 8, which presents a graph 800 of schedule filling (or fraction of a schedule 810) as a function of load 712 for a scheduler that includes a FS. As expected, the schedule filling is highest under light loads.

Simulations were also performed for a smaller switch with: 32 ports, a data cell L equal to 64 B, a link data rate C of 10 Gbps, and 3 PWWFA subschedulers. These simulations show similar relations, although the improvements given by the FS scheduling techniques are less pronounced. For example, under a load of 0.1, the latency with a PWWFA scheduling technique is 2.13 slots, which is 109 ns (recall that data cells in the 32-port simulations are 64 B long). However, the latency with the PWWFA-FS 'remove-all' scheduling technique is 1.2 slots (61 ns), which gives a 1.7-fold improvement over the latencies of the PWWFA scheduling technique. Moreover, the latency of PWWFA-FS 'leave-one' scheduling technique is 1.1 slots (56 ns), a nearly 2-fold improvement.

Figure 9A:
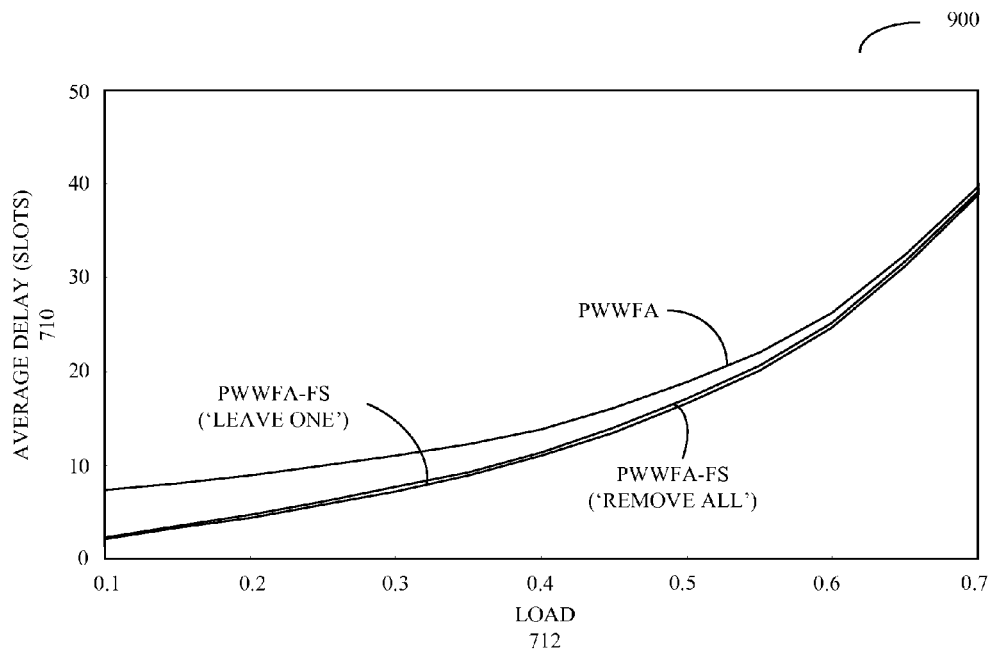
FIG. 9A is a graph of average delay as a function of load for a scheduler in accordance with an embodiment of the present invention.
Figure 9B:
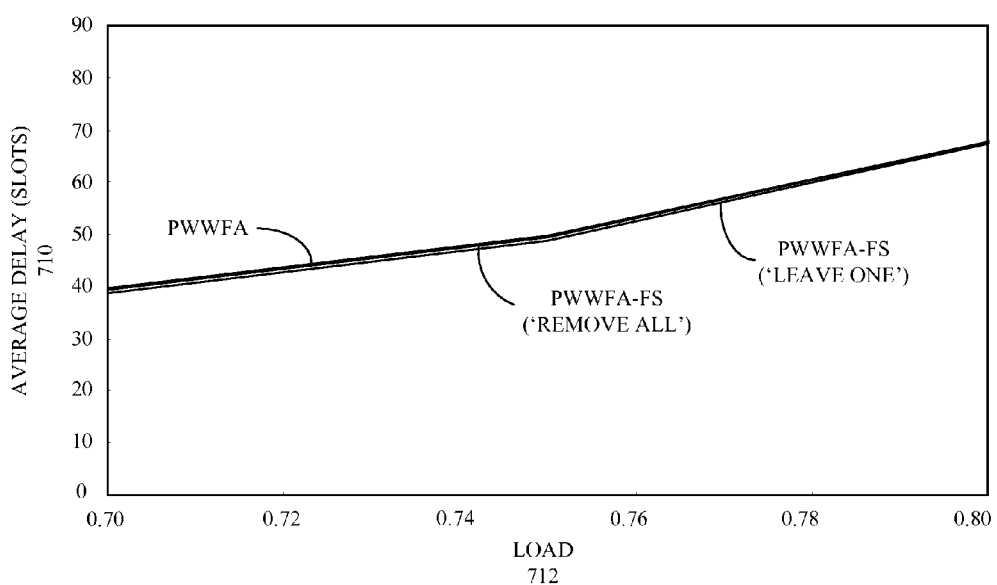
FIG. 9B is a graph of average delay as a function of load for a scheduler in accordance with an embodiment of the present invention.

Results for on-off traffic are shown in FIG. 9A, which presents a graph 900 of average delay 710 as a function of (light) load 712 for a scheduler, and FIG. 9B, which presents a graph 950 of average delay 710 as a function of (heavy) load 712 for the scheduler.

In some embodiments, scheduler 100 (FIGS. 1 and 3), scheduler 200 (FIG. 2), scheduler 400 (FIG. 4), binary arbiter 500 (FIGS. 5A and 5B), and/or scheduler 600 (FIG. 6) include fewer or additional components. For example, FS 212 (FIG. 2) may be disabled if a load on the scheduler 200 (FIG. 2) exceeds a predetermined threshold, such as 0.7. Moreover, two or more components may be combined into a single component and/or a position of one or more components may be changed.

Note that in some embodiments sharing of the switch (i.e., the schedules) may be based on: a fairness of the sharing of the switch between multiple data streams; a utilization of switch resources; a priority allocation; and/or a bandwidth allocation.

In some embodiments, the switch is implemented using multiple chips, where at least adjacent chips communicate with each other using proximity communication, such as: capacitively coupled proximity communication, inductively coupled proximity communication, magnetically coupled proximity communication, conductively coupled proximity communication, and/or optical proximity communication.

Moreover, while the previous embodiments have included a FS with a PWWFA scheduler, in other embodiments the FS may be combined with a scheduler that implements one of a variety of scheduling techniques, including: a round-robin scheduler, a scheduler based on a pipelined iterative scheme, a parallel-iterative-matching (PIM) scheduler, a pipeline-based maximal-size matching (PMM) scheduler, and/or another wrapped wave front arbiter (WWFA).

We now discuss methods for determining the schedule for the switch. FIG. 10 presents a flowchart illustrating a process 1000 for determining a schedule for a switch, which may be implemented by a scheduler. During operation, the scheduler determines a schedule for a group of requests, associated with multiple data streams, that are received for output ports of the switch, where the schedule matches input ports to output ports of the switch for a given data cell time (1010). Note that the schedule may be determined using an arbitration technique during a time interval. Moreover, the scheduler may assign an additional request, which was received at a time that precedes a current time by less than the time interval, to a portion of the switch which is available in the schedule (1012), thereby reducing a latency of the scheduler.

In some embodiments of process 1000, there may be additional or fewer operations. Moreover, the order of the operations may be changed and/or two or more operations may be combined into a single operation. Additionally, the preceding operations may be implemented using hardware and/or software, as is known in the art.

Figure 11:
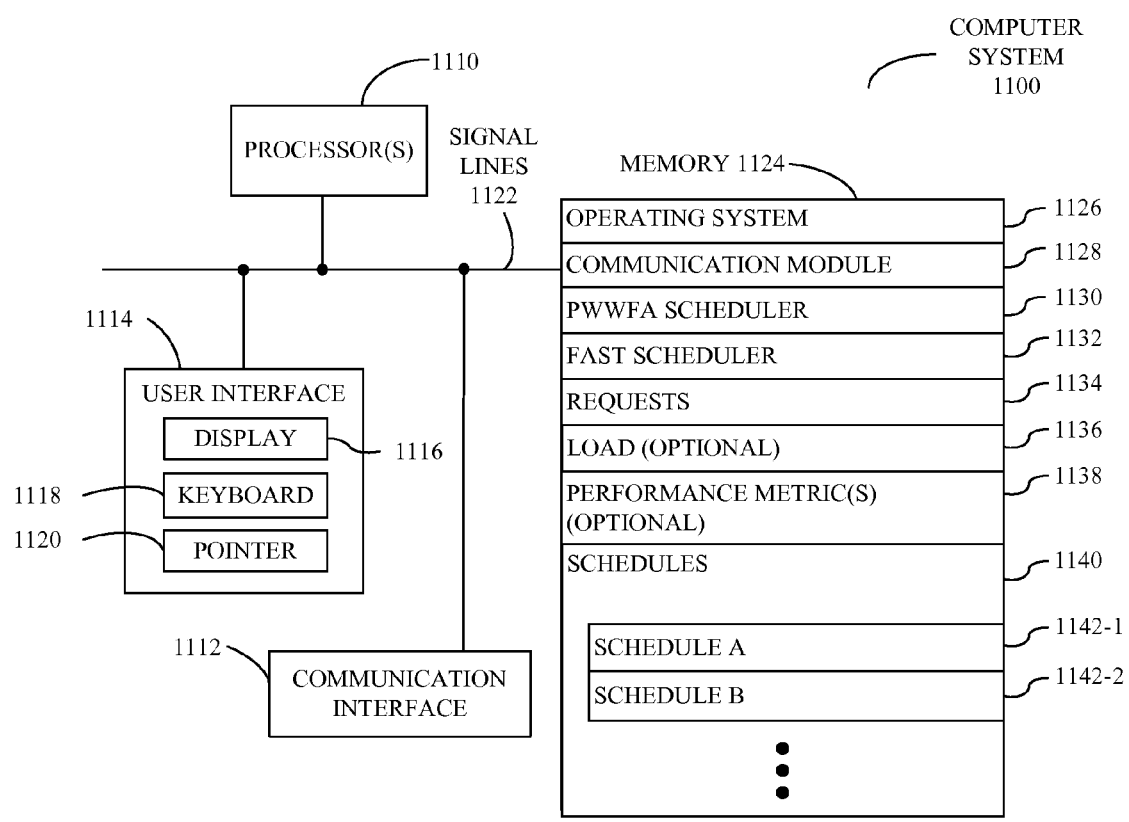
FIG. 11 is a block diagram illustrating a computer system in accordance with an embodiment of the present invention.

We now describe embodiments of a computer system. FIG. 11 presents a block diagram illustrating an embodiment of computer system 1100. Computer system 1100 includes: one or more processors (or processor cores) 1110, a communication interface 1112, a user interface 1114, and one or more signal lines 1122 coupling these components together. Note that the one or more processors (or processor cores) 1110 may support parallel processing and/or multi-threaded operation, the communication interface 1112 may have a persistent communication connection, and the one or more signal lines 1122 may constitute a communication bus. Moreover, the user interface 1114 may include: a display 1116, a keyboard 1118, and/or a pointer 1120, such as a mouse.

Memory 1124 in the computer system 1100 may include volatile memory and/or non-volatile memory. More specifically, memory 1124 may include: ROM, RAM, EPROM, EEPROM, flash, one or more smart cards, and a computer-readable storage medium, e.g., one or more magnetic disc storage devices, and/or one or more optical storage devices. Memory 1124 may store an operating system 1126 that includes procedures (or a set of instructions) for handling various basic system services for performing hardware-dependent tasks. Moreover, memory 1124 may also store communications procedures (or a set of instructions) in a communication module 1128. These communication procedures may be used for communicating with one or more computers, devices and/or servers, including computers, devices and/or servers that are remotely located with respect to the computer system 1100.

Memory 1124 may also include one or more program modules (or a set of instructions), including PWWFA scheduler 1130 (or a set of instructions) and/or fast scheduler 1132 (or a set of instructions). Based on requests 1134, PWWFA scheduler 1130 and/or fast scheduler 1132 may determine one or more schedules 1140, such as schedule A 1142 or schedule B 1144. In some embodiments, the schedules 1140 are determined, at least in part, based on optional performance metrics 1138, such as fairness or throughput. Moreover, in some embodiments fast scheduler 1132 is selectively disabled or enabled based on optional load 1136.

Instructions in the various modules in the memory 1124 may be implemented in: a high-level procedural language, an object-oriented programming language, and/or in an assembly or machine language. The programming language may be compiled or interpreted, i.e., configurable or configured, to be executed by the one or more processors (or processor cores) 1110.

Although the computer system 1100 is illustrated as having a number of discrete components, FIG. 11 is intended to be a functional description of the various features that may be present in the computer system 1100 rather than as a structural schematic of the embodiments described herein. In practice, and as recognized by those of ordinary skill in the art, the functions of the computer system 1100 may be distributed over a large number of servers or computers, with various groups of the servers or computers performing particular subsets of the functions. In some embodiments, some or all of the functionality of the computer system 1100 may be implemented in one or more application-specific integrated circuits (ASICs) and/or one or more digital signal processors (DSPs).

Computer system 1100 may include fewer components or additional components. Moreover, two or more components may be combined into a single component and/or a position of one or more components may be changed. In some embodiments the functionality of computer system 1100 may be implemented more in hardware and less in software, or less in hardware and more in software, as is known in the art.

Figure 12:
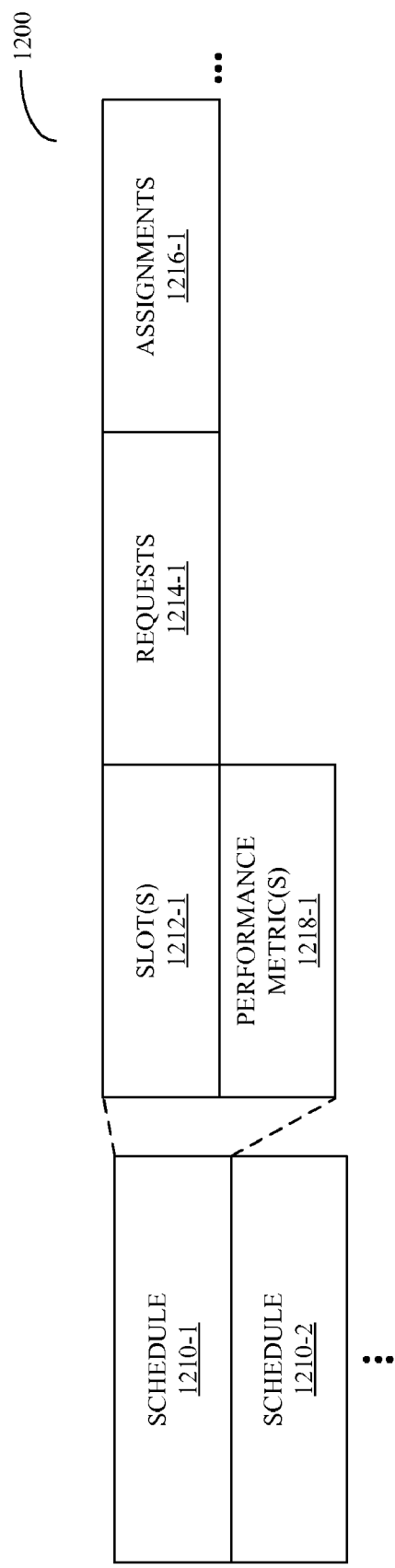
FIG. 12 is a block diagram illustrating a data structure in accordance with an embodiment of the present invention.

We now discuss data structures that may be used in computer system 1100. FIG. 12 presents a block diagram illustrating an embodiment of a data structure. This data structure may include schedules 1210. More specifically, a given instance of the schedules 1210, such as schedule 1210-1, may include multiple entries for: one or more slots 1212-1, one or more requests 1214-1 received on input ports, assignments 1216-1 of one or more output ports, and/or one or more performance metrics 1218-1.

Note that in some embodiments of the data structure 1200 there may be fewer or additional components. Moreover, two or more components may be combined into a single component and/or a position of one or more components may be changed.

While the previous embodiments have used the technique and the scheduler to determine schedules for a switch, in other embodiments the technique and/or the scheduler may be used to determine schedules for sharing of a common resource (chosen from a wide variety of common resources) between multiple data streams which include characteristic time intervals (such as slots). For example, the common resource may be an Internet router or a multi-core processor.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A scheduler for a switch, wherein the switch is configured to couple input ports to output ports, wherein the scheduler is configured to:

determine a schedule for a group of requests, associated with multiple data streams, that are received for the output ports of the switch,
wherein the schedule includes a set of waves that each match each input port of the switch to a corresponding output port of the switch for a given data cell time, each wave comprising a set of switching elements configured to service a request to forward data from a corresponding input port in the wave to a corresponding output port, and
wherein the schedule is determined using an arbitration technique during a time interval;

receive an additional request while determining a current wave for the schedule, wherein the additional request was not included in the group of requests, wherein the additional request requests an input port that has been matched to an output port in a wave that precedes the current wave, and wherein the additional request was received at a time that precedes a current time by less than the time interval; and assign the additional request to a portion of the switch which is available in the schedule, thereby reducing a latency of the scheduler.

2. The scheduler of claim 1, wherein, if the additional request is assigned to the portion of the switch, the additional request is excluded from schedules determined using the arbitration technique.

3. The scheduler of claim 1, wherein the multiple data streams are received on the input ports.

4. The scheduler of claim 1, wherein the time interval is greater than the given data cell time.

5. The scheduler of claim 1, wherein the assignment of the additional request is based on a fast-scheduling technique.

6. The scheduler of claim 5, wherein the fast-scheduling technique involves a leave-one scheme in which the additional request can be granted even if there is a conflict involving more than one request for the portion of the switch.

7. The scheduler of claim 6, wherein the conflict is resolved using a cascaded tree of binary arbiters.

8. The scheduler of claim 7, wherein resolution of the conflict is based on previous conflict-resolution decisions.

9. The scheduler of claim 5, wherein the fast-scheduling technique involves a remove-all scheme in which the additional resource request is granted if there is only one request for the portion of the switch and the portion of the switch is not included in the schedule.

10. The scheduler of claim 1, wherein the schedule is further determined based, at least in part, on the assignment of the additional request.

11. The scheduler of claim 1, wherein the portion of the switch includes one or more output ports.

12. The scheduler of claim 1, wherein the arbitration technique is based on a parallel-wrapped wave front arbiter (PW-WFA).

13. The scheduler of claim 1, wherein the arbitration technique involves pipelined calculations of multiple schedules associated with corresponding data cell times; and
wherein a calculation of a given schedule is completed during each data cell time.

14. The scheduler of claim 1, wherein the assignment of the additional request is disabled if a load on the scheduler exceeds a predetermined threshold.

15. The scheduler of claim 14, wherein the latency of the scheduler is reduced for loads on the scheduler that are less than the predetermined threshold.

16. The scheduler of claim 1, wherein the additional request was received during a data cell time that immediately precedes a current data cell time.

17. The scheduler of claim 1, wherein the sharing of the switch is based on a fairness of the sharing of the switch between multiple data streams.

18. The scheduler of claim 1, wherein the sharing of the switch is based on one or more of:
   a utilization of switch resources;
   a priority allocation; and
   a bandwidth allocation.

19. A method for scheduling a switch, wherein the switch is configured to couple input ports to output ports, comprising:
   determining a schedule for a group of requests, associated with multiple data streams, that are received for the output ports of the switch, wherein the schedule includes a set of waves that each match each input port of the switch to a corresponding output port of the switch for a given data cell time, each wave comprising a set of switching elements configured to service a request to forward data from a corresponding input port in the wave to a corresponding output port, and wherein the schedule is determined using an arbitration technique during a time interval;
   receiving an additional request while determining a current wave for the schedule, wherein the additional request was not included in the group of requests, wherein the additional request requests an input port that has been matched to an output port in a wave that precedes the current wave, and wherein the additional request was received at a time that precedes a current time by less than the time interval; and
   assigning the additional request to a portion of the switch which is available in the schedule, thereby reducing a latency of the scheduler.

20. A computer-program product for use in conjunction with a common resource, the computer-program product comprising a non-transitory computer-readable storage medium and a computer-program mechanism embedded therein for scheduling a switch, wherein the switch is configured to couple input ports to output ports, the computer-program mechanism including:
   instructions for determining a schedule for a group of requests, associated with multiple data streams, that are received for the output ports of the switch, wherein the schedule includes a set of waves that each match each input port of the switch to a corresponding output port of the switch for a given data cell time, each wave comprising a set of switching elements configured to service a request to forward data from a corresponding input port in the wave to a corresponding output port, and wherein the schedule is determined using an arbitration technique during a time interval;
   instructions for receiving an additional request while determining a current wave for the schedule, wherein the additional request was not included in the group of requests, wherein the additional request requests an input port that has been matched to an output port in a wave that precedes the current wave, and wherein the additional request was received at a time that precedes a current time by less than the time interval; and
   instructions for assigning the additional request to a portion of the switch which is available in the schedule, thereby reducing a latency of the scheduler.

* * * * *